United States Patent
Heo et al.

(10) Patent No.: US 9,489,037 B2
(45) Date of Patent: Nov. 8, 2016

(54) POWER MANAGEMENT DEVICE AND SYSTEM-ON-CHIP INCLUDING THE SAME

(71) Applicant: SAMSUNG ELECTRONICS CO., LTD., Suwon-si (KR)

(72) Inventors: Jung-Hun Heo, Suwon-si (KR); Jong-Pil Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 14/590,504

(22) Filed: Jan. 6, 2015

(65) Prior Publication Data

US 2015/0234452 A1    Aug. 20, 2015

(30) Foreign Application Priority Data

Feb. 17, 2014  (KR) .................. 10-2014-0017765

(51) Int. Cl.
| | | |
|---|---|---|
| *G06F 1/26* | (2006.01) | |
| *G06F 1/32* | (2006.01) | |
| *H02M 3/335* | (2006.01) | |
| *H02M 1/00* | (2006.01) | |
| *G05F 1/10* | (2006.01) | |
| *G05F 3/02* | (2006.01) | |

(52) U.S. Cl.
CPC ............ *G06F 1/3296* (2013.01); *G05F 1/10* (2013.01); *G05F 3/02* (2013.01); *G06F 1/26* (2013.01); *H02M 3/33507* (2013.01); *H02M 3/33561* (2013.01); *H02M 2001/009* (2013.01); *H02M 2001/0045* (2013.01); *Y02B 60/1285* (2013.01)

(58) Field of Classification Search
CPC .............. G05F 1/10; G05F 3/02; G06F 1/26; H02M 2001/0045; H02M 3/33507; H02M 2001/009; H02M 3/33561; Y02B 60/1285
See application file for complete search history.

(56) References Cited

U.S. PATENT DOCUMENTS

| | | | |
|---|---|---|---|
| 6,653,888 B2 | 11/2003 | Lee | |
| 7,664,971 B2 | 2/2010 | Oh | |
| 7,869,299 B2 | 1/2011 | Hayashi et al. | |
| 8,386,806 B2 | 2/2013 | Ooi et al. | |
| 8,502,590 B2 | 8/2013 | Friddell | |
| 8,510,582 B2 | 8/2013 | Naffziger et al. | |
| 2007/0055900 A1* | 3/2007 | Choi ................. | G06F 1/3203 713/300 |
| 2007/0069807 A1* | 3/2007 | Ho ..................... | G06F 1/28 327/541 |
| 2008/0291750 A1* | 11/2008 | Takahashi ............ | G11O 5/145 365/189.09 |
| 2011/0260783 A1 | 10/2011 | Kawasaki | |
| 2013/0049720 A1* | 2/2013 | Nien ................... | H02M 3/1588 323/271 |
| 2013/0159734 A1 | 6/2013 | Pan | |
| 2013/0262894 A1 | 10/2013 | Lee et al. | |
| 2014/0145691 A1* | 5/2014 | Nagda ................. | G05F 1/46 323/271 |
| 2015/0121103 A1* | 4/2015 | Kanemasa ............ | G06F 1/324 713/322 |

* cited by examiner

*Primary Examiner* — Xuxing Chen
(74) *Attorney, Agent, or Firm* — Sughrue Mion, PLLC

(57) ABSTRACT

Provided is a power management device which includes a first regulator, a second regulator and a control register unit. The first regulator provides a first driving voltage to a first power domain of an application processor. The second regulator provides a second power domain of the application processor with a second driving voltage having a correlation with the first driving voltage. The control register unit controls, in response to a command from the application processor, a reference voltage generation circuit that provides a first reference voltage and a second reference voltage to the first regulator and the second regulator, respectively. The level of the first driving voltage is maintained in a first driving mode. The first driving voltage and the second driving voltage have a set voltage difference in a second driving mode.

20 Claims, 13 Drawing Sheets

POWER MANAGEMENT DEVICE AND SYSTEM-ON-CHIP INCLUDING THE SAME

CROSS-REFERENCE TO RELATED APPLICATION

This application claims priority under 35 USC §119 to Korean Patent Application No. 10-2014-0017765, filed on Feb. 17, 2014 in the Korean Intellectual Property Office, the content of which are herein incorporated by reference in its entirety.

BACKGROUND

1. Technical Field

Example embodiments relate generally to power management, and more particularly to power management devices and system-on-chips (SoCs) including the same.

2. Description of the Related Art

A microprocessor is a processing apparatus integrated on a single integrated circuit, or chips, and systematically performs operations in a preset order under control of a microcode.

A system-on-chip (SoC) is used, generally, to refer to a processing apparatus that integrates various functional blocks (for example, a central processing unit (CPU), a memory, an interface unit, a digital signal processing unit, an analog signal processing unit, etc.) in a single, or a few, semiconductor integrated circuits (ICs) to implement an electronic system, such as a computer system, using a limited number of ICs.

The SoCs have evolved to complex systems including various functions such as multimedia, graphics, an interface, a security, etc. As diverse capabilities and functionality converge in portable devices that are battery-powered, researches are made for reducing power consumption of the portable devices while enhancing performance.

SUMMARY

One or more exemplary embodiments provide a power management device, capable of supporting a stable operation and reducing power consumption.

One or more exemplary embodiments also provide a system-on-chip (SoC) including the power management device.

According to an aspect of an exemplary embodiment, there is provided a power management device which may include: a first regulator, a second regulator and a control register unit. The first regulator provides a first driving voltage to a first power domain of an application processor. The second regulator provides a second driving voltage to a second power domain of the application processor. A level of the second driving voltage is lower than a level of the first driving voltage, and the second driving voltage has a correlation with the first driving voltage. The control register unit controls, in response to a command from the application processor, a reference voltage generation circuit that provides a first reference voltage and a second reference voltage to the first regulator and the second regulator, respectively. The level of the first driving voltage is maintained in a first driving mode. The first driving voltage and the second driving voltage have a set voltage difference in a second driving mode. The level of the second driving voltage is lower than the reference level in the first driving mode and the level of the second driving voltage is equal to or higher than the reference level in the second driving mode.

In some embodiments, the control register unit may include a first register, a second register and a control logic. The first register stores the reference level. The second register stores at least one set voltage difference between the first driving voltage and the second driving voltage. The control logic generates a first control voltage and a second control voltage for controlling the first regulator and the second regulator, respectively, by referring to the first register and the second register according to a driving mode in response to the command.

The power management device may further include the reference voltage generation circuit that generates the first reference voltage to be provided to the first regulator in response to the first control voltage and generates the second reference voltage to be provided to the second regulator in response to the second control voltage.

The reference voltage generation circuit may include a first reference voltage generator and a second reference voltage generator. The first reference voltage generator maintains a level of the first reference voltage in response to the first control voltage in the first driving mode, and increases the level of the first reference voltage in response to the first control voltage in the second driving mode. The second reference voltage generator increases a level of the second reference voltage in response to the second control voltage in the second driving mode.

The control logic may maintain a level of the first control voltage in the first driving mode in response to the command.

The control logic may increase a level of the first control voltage in the second driving mode in response to the command.

In some embodiments, the first regulator may be a low drop-out regulator and the second regulator may be a buck converter.

According to an aspect of another exemplary embodiment, there is provided a system-on-chip (SoC) which may include: an application processor and a power management device. The application processor generates a command that directs a driving mode of a first driving voltage and a second driving voltage according to operations of a first power domain and a second power domain among a plurality of power domains. The first power domain and the second power domain have a correlation. The first driving voltage and the second driving voltage are respectively provided to the first power domain and the second power domain. The power management device adjusts levels of the first driving voltage and the second driving voltage in response to the command such that the level of the first driving voltage is maintained in a first driving mode, and the first driving voltage and the second driving voltage have a set voltage difference in a second driving mode. The power management device includes a first regulator, a second regulator and a control register unit. The first regulator generates the first driving voltage. The second regulator generates the second driving voltage. The control register unit generates a first control voltage and a second control voltage that control a reference voltage generation circuit that generate a first reference voltage and a second reference voltage. The first reference voltage and the second reference voltage are provided to the first regulator and the second regulator, respectively.

In some embodiments, the power management device may further include the reference voltage generation circuit that generates the first reference voltage to be provided to the first regulator in response to the first control voltage, and generates the second reference voltage to be provided to the second regulator in response to the second control voltage.

The reference voltage generation circuit may include a first reference voltage generator and a second reference voltage generator. The first reference voltage generator may maintain a level of the first reference voltage in response to the first control voltage in the first driving mode, and may increase the level of the first reference voltage in response to the first control voltage in the second driving mode. The second reference voltage generator may increase a level of the second reference voltage in response to the second control voltage in the second driving mode.

The application processor may include a central processing unit (CPU) core that implements a dynamic voltage frequency scaling (DVFS) controller that generates the command.

The application processor may transmit the command to the power management device through an inter-integrated circuit (I2C) interface.

The DVFS controller may generate the command that directs the driving mode based on a comparison of the second driving voltage and a reference level.

The DVFS controller may generate the command that directs the first driving mode when the level of the second driving voltage needs to be lower than the reference level.

The first regulator may maintain the level of the first driving voltage based on a first input voltage and the first reference voltage, in response to the command that directs the first driving mode.

The first reference voltage generator may generate the first reference voltage such that the first driving voltage has a constant voltage difference with respect to the reference level.

The DVFS controller may generate the command that directs the second operation mode when the level of the second driving voltage needs to be equal to or higher than the reference level.

The first regulator may increase the level of the first driving voltage based on a first input voltage and the first reference voltage, and the second regulator may increase the level of the second driving voltage based on a second input voltage and the second reference voltage, in response to the command that directs the second driving mode.

The first reference voltage generator may generate the first reference voltage such that the level of the first driving voltage increases in cooperation with the second driving voltage in the second driving mode.

The first power domain may correspond to at least one memory cell of a static random access memory (SRAM) in the application processor, and the second power domain may correspond to a peripheral circuit of the SRAM. The peripheral circuit may access the at least one memory cell.

Accordingly, when levels of a first driving voltage and a second driving voltage, respectively provided to a first power domain and a second power domain that have a correlation, need to be changed, an SoC may reduce power consumption and support a stable operation by changing the level of the second driving voltage and by adaptively changing or maintaining the level of the first driving voltage with a set voltage difference between the first driving voltage and the second driving voltage being maintained.

BRIEF DESCRIPTION OF THE DRAWINGS

Features will become apparent to those of ordinary skill in the art by describing in detail exemplary embodiments with reference to the attached drawings, in which.

DETAILED DESCRIPTION OF THE EXEMPLARY EMBODIMENTS

Figure 1:
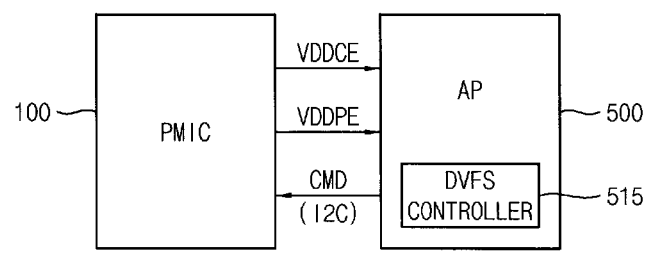
FIG. 1 is a block diagram illustrating a system-on-chip (SoC) according to an exemplary embodiment.

Various exemplary embodiments will be described more fully with reference to the accompanying drawings. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be described in detail with reference to accompanying drawings. The same reference numerals will be assigned to the same elements, and the details thereof will be omitted in order to avoid redundancy.

FIG. 1 is a block diagram illustrating a system-on-chip (SoC) according to an exemplary embodiment.

Referring to FIG. 1, an SoC 10 includes a power management device 100 and an application processor 500. The power management device 100 may be also referred to as a power management integrated circuit (PMIC).

The power management device 100 provides the application processor 500 with a first driving voltage VDDCE and a second driving voltage VDDPE. A level of the first driving voltage VDDCE may be higher than a level of the second driving voltage VDDPE, and the first and second driving voltages VDDCE and VDDPE may have a correlation. For example, the first driving voltage VDDCE may be provided to a cell array of a static random access memory (SRAM) in the application processor 500, and the second driving voltage VDDPE may be provided to a peripheral circuit for accessing the cell array of the SRAM. A dynamic voltage frequency scaling (DVFS) controller 515, which may be implemented in an intellectual property (IP) in the application processor 500, may provide the power management device 100 with a command CMD that directs a driving mode of the power management device 100 based on at least one of the levels of the first and second driving voltages VDDCE and VDDPE. The application processor 500 may transmit the command CMD to the power management device 100 through an inter-integrated circuit (I2C) interface. The power management device 100 may adjust the levels of the first and second driving voltages VDDCE and VDDPE to be provided to the application processor 500 according to the driving mode, in response to the command CMD.

Figure 2:
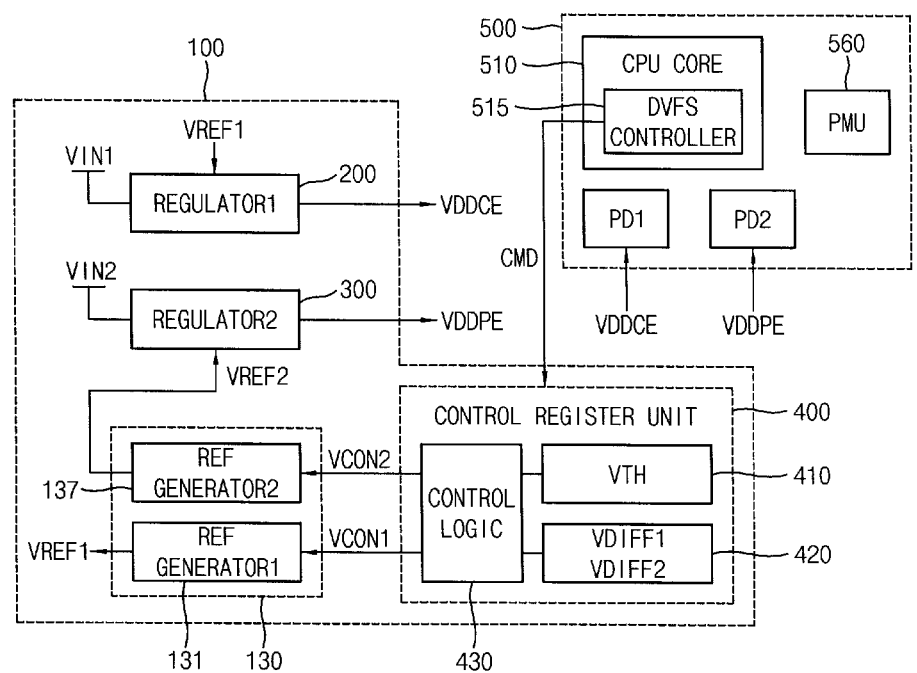
FIG. 2 is a block diagram illustrating the SoC of FIG. 1 in detail, according to an exemplary embodiment.

FIG. 2 is a block diagram illustrating the SoC of FIG. 1 in detail, according to an exemplary embodiment.

Referring to FIG. 2, the SoC 100 includes the power management device 100 and the application processor 500.

The power management device 100 includes a first regulator 200, a second regulator 300, a reference voltage generation circuit 130, and a control register unit 400. The reference voltage generation circuit 130 may include a first reference voltage generator 131 and a second reference voltage generator 137. The control register unit 400 includes a first register 410, a second register 420 and a control logic 430.

The application processor 500 includes a central processing unit (CPU) core 510, a power management unit (PMU) 560, a first power domain PD1 and a second power domain PD2. The first power domain PD1 receives the first driving voltage VDDCE and operates based on the first driving voltage VDDCE. The second power domain PD2 receives the second driving voltage VDDPE and operates based the second driving voltage VDDPE. The PMU 560 may control supply/cutoff of the first driving voltage VDDCE to the first power domain PD1 and supply/cutoff of the second driving voltage VDDPE to the second power domain PD2. The DVFS controller 515, which is implemented in the CPU core 510, may provide the power management device 100 with the command CMD that directs the driving mode of the first and second regulators 200 and 300 based on a DVFS policy according to operations of the first power domain PD1 and the second power domain PD2. When the application processor 500 is to change the level of the second driving voltage VDDPE to be provided to the second power domain PD2, the application processor 500 may transmit the command CMD that directs a change of the level of the second driving voltage VDDPE to the power management device 100 through the I2C interface. The DVFS controller 515 may be a program code or software that is installed in a memory in the application processor 500 or a memory connected to the application processor 500. The DVFS controller 515 may be executed to perform a DVFS operation when the application processor 500 is powered on. The CPU core 510 may implement the DVFS controller 515 on the application processor 500.

The first and second power domains PD1 and PD2 are power domains that receive the first and second driving voltages VDDCE and VDDPE. The first driving voltage VDDCE and the second driving voltage VDDPE have a correlation. The first and second power domains PD1 and PD2 may be power domains of each IP in the application processor 500 or may be power domains in the CPU core 510. Here, the IP means a circuit, a logic or a combination of these which may be integrated in the SoC 10.

The first register 410 may store a reference level VTH associated with second driving voltage VDDPE. The second register 420 may store set voltage differences VDIFF1 and VDIFF2 between the first driving voltage VDDCE and the second driving voltage VDDPE according to the DVFS policy of the DVFS controller 515. The application processor 500 may program in advance the reference level VTH in the first register 410 and the set voltage differences VDIFF1 and VDIFF2 between the first and second driving voltages VPPCE and the VDDPE in the second register 420. The control logic 430 decodes the command CMD, adjusts levels of a first control voltage VCON1 and a second control voltage VCON2 by referring to contents stored in the first and second registers 410 and 420 according to the driving mode included in the decoded command, and provides the first and second control voltages VCON1 and VCON2 to the first and second reference voltage generators 131 and 137, respectively.

The first reference voltage generator 131 adjusts a level of the first reference voltage VREF1 according to the driving mode and the DVFS policy based on the first control voltage VCON1, and provides the first reference voltage VREF1 to the first regulator 200. The second reference voltage generator 137 adjusts a level of the second reference voltage VREF2 according to the driving mode and the DVFS policy based on the second control voltage VCON2, and provides the second reference voltage VREF2 to the second regulator 300.

The first regulator 200 generates the first driving voltage VDDCE based on a first input voltage VIN1 and the first reference voltage VREF1. The second regulator 300 generates the second driving voltage VDDPE based on a second input voltage VDDPE and the second reference voltage VREF2.

When the application processor 500 needs to lower the level of the second driving voltage VDDPE below the reference level VTH according to the DVFS policy, the DVFS controller 515 transmits the command CMD directing a first driving mode to the control logic 430. The control logic 430 refers to the reference level VTH stored in the first register 410 and adjusts the level of the first control voltage VCON1 to be provided to the first reference voltage generator 131, in response to the CMD directing the first driving mode. The first reference voltage generator 131 adjusts the level of the first reference voltage VREF1 to be provided to the first regulator 200 in response to the first control voltage VCON1 such that the first regulator 200 generates the first driving voltage VDDCE having a constant voltage difference with the reference level VTH. The first driving voltage VDDCE is maintained at the constant level in the first driving mode, and the first regulator 200 may provide the first driving voltage VDDCE to other power domains that require a driving voltage whose level is equal to or lower than the first driving voltage VDDCE. Therefore, the number of regulators required in the power management device 100 may be reduced.

When the application processor 500 needs to set the level of the second driving voltage VDDPE above the reference level VTH according to the DVFS policy, the DVFS controller 515 transmits the command CMD directing a second driving mode to the control logic 430. The control logic 430 refers to the set voltage differences VDIFF1 and VDIFF2 stored in the second register 420, adjusts the level of the first control voltage VCON1 to be provided to the first reference voltage generator 131, and adjusts the level of the second control voltage VCON2 to be provided to the second reference voltage generator 137, in response to the CMD directing the second driving mode. The first reference voltage generator 131 adjusts the level of the first reference voltage VREF1 to be provided to the first regulator 200 in response to the first control voltage VCON1 such that the first regulator 200 generates the first driving voltage VDDCE conforming to the DVFS policy. The second reference voltage generator 137 adjusts the level of the second reference voltage VREF2 to be provided to the second regulator 300 in response to the second control voltage VCON2 such that the second regulator 300 generates the second driving voltage VDDPE conforming to the DVFS policy. The first driving voltage VDDCE may be changed in cooperation with a change of the second driving voltage VDDPE according to the DVFS policy.

Figure 3:
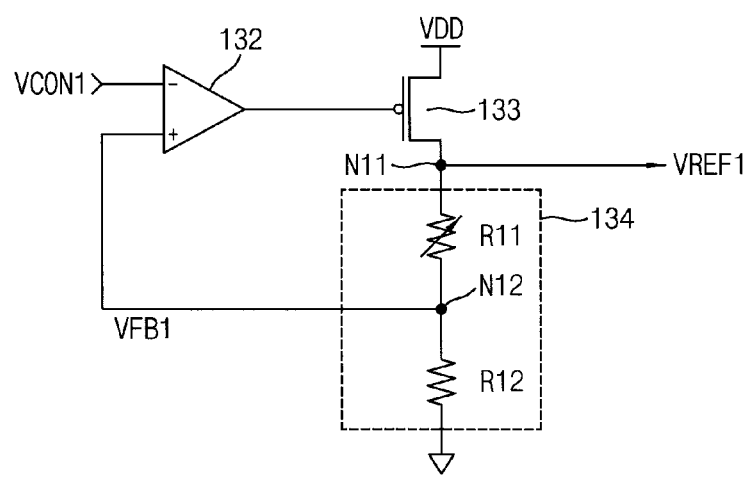
FIG. 3 is a circuit diagram illustrating a first reference voltage generator in FIG. 2 according to an exemplary embodiment.

FIG. 3 is a circuit diagram illustrating the first reference voltage generator in FIG. 2, according to an exemplary embodiment.

Referring to FIG. 3, the first reference voltage generator 131 may be implemented with a linear regulator. The first reference voltage generator 131 may include an operational amplifier 132, a p-channel metal-oxide semiconductor (PMOS) transistor 133 and a feedback unit 134 that includes resistors R11 and R12. The PMOS transistor 133 has a source connected to a power supply voltage VDD, a drain connected to the resistor R11 at a node N11 and a gate connected to an output of the operational amplifier 132. The resistors R11 and R12 in the feedback unit 134 are connected to each other at a node N12. The resistor R11 is connected to the mode N11 and the resistor R12 is connected to a ground voltage. The first reference voltage VREF1 may be provided at the node N11, i.e., the drain of the PMOS transistor 133. A feedback voltage VFB1 is provided to a positive input terminal of the operational amplifier 132. The feedback voltage VFB1 is acquired by dividing the first reference voltage VREF1 by a ratio of the resistors R11 and R12. The first control voltage VCON1 is provided to a negative input terminal of the operational amplifier 132. The output of the operational amplifier 132 is connected to the gate of the PMOS transistor 133. Therefore, the first reference voltage generator 131 may generate the first reference voltage VREF1 following a level of the first control voltage VCON1 based on the power supply voltage VDD. Accordingly, the control logic 430 may generate the first control voltage VCON1 having the level conforming to the driving mode and the DVFS policy in response to the command CMD, and the first reference voltage generator 131 may generate the first reference voltage VREF1 following the level of the first control voltage VCON1.

A configuration and an operation of the first reference voltage generator 131 are described with reference to FIG. 3, and a configuration and an operation of the second reference voltage generator 137 may be substantially the same as the configuration and the operation of the first reference voltage generator 131. The second reference voltage generator 137 may include an operational amplifier having a negative input terminal that receives the second control voltage VCON2. In addition, the level of the second control voltage VCON2 may be lower than the level of the first control voltage VCON1.

Figure 4:
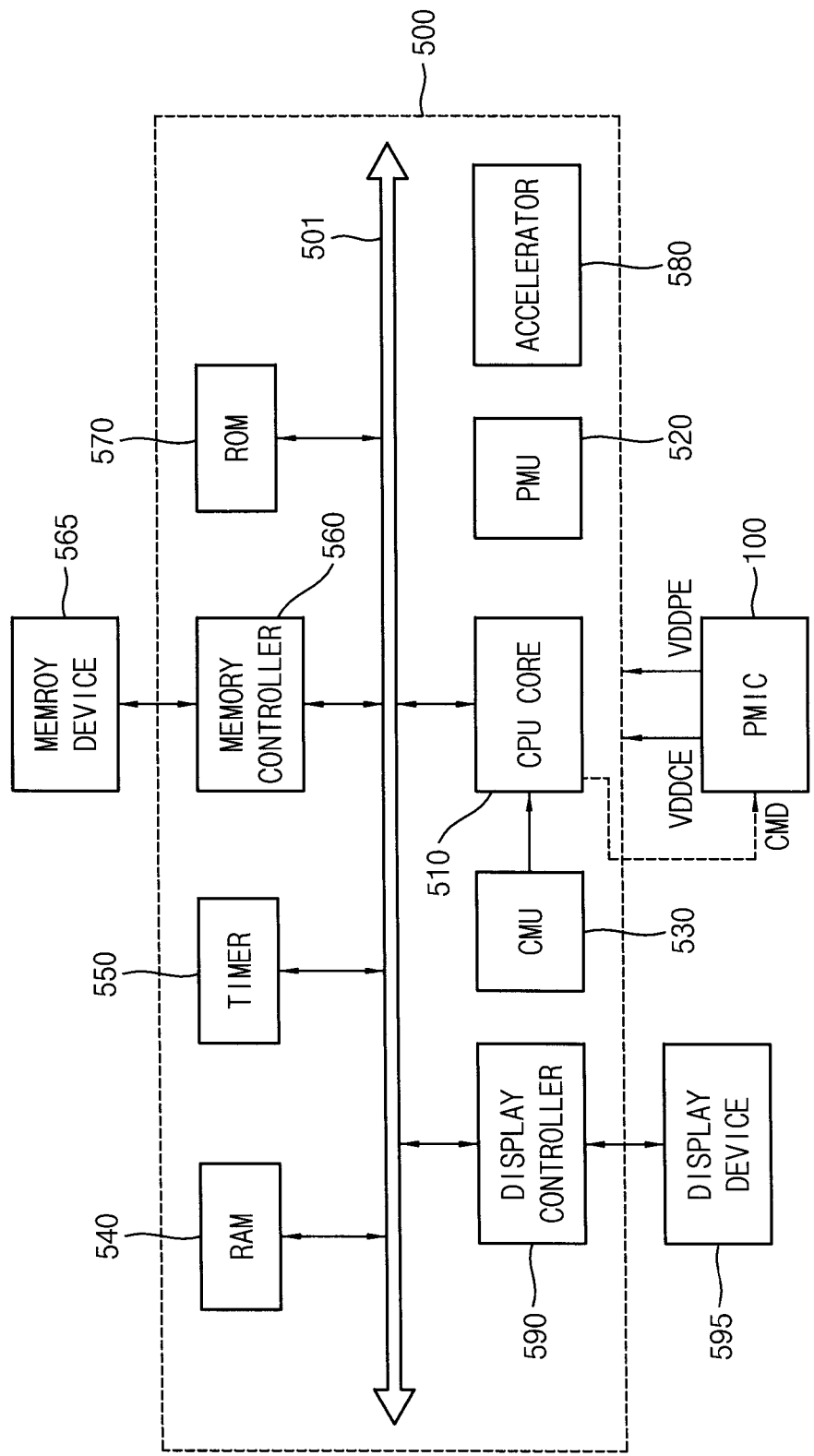
FIG. 4 is a block diagram illustrating an application processor in FIG. 2 in detail, according to an exemplary embodiment.

FIG. 4 is a block diagram illustrating the application processor in FIG. 2 in detail, according to an exemplary embodiment.

Figure 5:
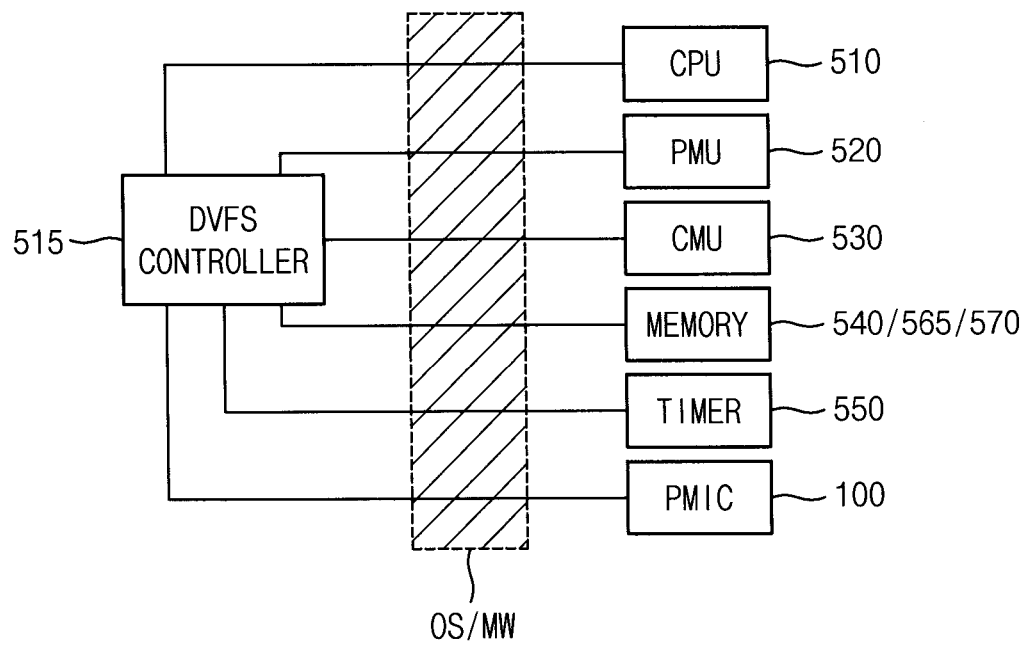
FIG. 5 is a conceptual diagram illustrating relationships between a dynamic voltage frequency scaling (DVFS) controller and other elements in the SoC of FIG. 4, according to an exemplary embodiment.

FIG. 5 is a conceptual diagram illustrating relationships between the DVFS controller and other elements in the SoC of FIG. 4, according to an exemplary embodiment.

Referring to FIG. 4, the application processor 500 may be connected to a memory device 565, a display device 595 and the power management device 100. The application processor 500, the memory device 565, the display device 595 and the power management device 100 may constitute an electronic system that may be implemented as a handheld device such as a mobile phone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book.

The application processor 500 may include the CPU core 510, the PMU 520, a clock management unit (CMU) 530, a display controller 590, a random access memory (RAM) 540, a timer 550, a memory controller 560, a read-only memory 570 and an accelerator 580.

The CPU core 510 may process or execute programs and/or data stored in the memory device 565. For example, the CPU core 510 may process or execute the programs and/or data in response to a clock signal that is output from a clock signal generator (not illustrated).

The CPU core 510 may be implemented by a multi-core processor. The multi-core processor is a single computing component with two or more independent actual processors (referred to as cores). Each of the processors may read and execute program instructions. The multi-core processor can drive a plurality of accelerators at a time, and therefore, a data processing system including the multi-core processor may perform a multi-acceleration.

The programs and/or the data stored in the ROM 570, the RAM 540, and the memory device 565 may be loaded to a memory in the CPU core 510 when necessary. The ROM 570 may store permanent programs and/or data. The ROM 570 may be implemented by an erasable programmable ROM (EPROM) or an electrically erasable programmable ROM (EEPROM).

The RAM 540 may temporarily store programs, data, or instructions. The programs and/or data stored in the memory 540 or 565 may be temporarily stored in the RAM 540 according to the control of the CPU core 510 or a booting code stored in the ROM 570. The RAM 540 may be implemented by a dynamic RAM (DRAM) or a static RAM (SRAM).

The accelerator 580 may refer to a hardware device or a co-processor for increasing the performance of processing multimedia or multimedia data such as a text, an audio, still images, an animation, a video, two-dimensional data, or three-dimensional data.

The CMU 530 may generate one or more operating clock signal(s). In some embodiments, the CMU 530 may include a phase-locked loop (PLL), a delayed-locked loop (DLL), or a crystal oscillator. The CMU 530 generates one or more operating clock signal(s) to the CPU core 510 and/or other circuits, such as the memory controller 560. The CMU 530 may be used to vary the frequency of an operating clock signal in response to control information provided by a DVFS controller 515. For example, the DVFS controller 515 may select one among a plurality of predetermined policies in response to a measured memory usage. In this manner, the DVFS controller 515 may control the CMU 530 according to the selected policy, and the CMU 530 may change the frequency of an operating clock signal to perform the selected policy under the control of the DVFS controller 515.

The PMU 520 may control a supply/cutoff of driving voltages provided to a plurality of power domains in the application processor 500.

The DVFS controller 515, implemented in the CPU core 510, may select (or determine) the DVFS policy according to operating states of the power domains that receives the first and second driving voltages VDDCE and the VDDPE, and may provide the power management device 100 with the command CMD directing the determined DVFS policy. The power management device 100 may adjust the levels of the first and second driving voltages VDDCE and VDDPE according to the driving mode directed by the command CMD.

The memory controller 560 is essentially an interface between the external memory device 565 and the application processor 500, and may control an overall operation of the memory device 565, as well as data exchanges between a host and the memory device 565. For example, the memory controller 560 may control an operation of the memory device 565 during read and write operations resulting from data requests made by the host. From the standpoint of the external memory device 565, the host may be, at any moment in time, any one of a number of "master devices", including (e.g.,) the CPU core 510, the accelerator 580, the display controller 590, etc.

The memory device 565 serves as data storage medium capable of receiving, storing, and providing indicated data under the control of a conventionally understood operating system (OS), various programs and various data. In some embodiments, the memory device 565 may be implemented with a volatile memory such as a DRAM. In other embodiments, the memory device 565 may be implemented with a non-volatile memory such as a flash memory, a phase-change RAM (PRAM), a magneto-resistive RAM (MRAM), a resistive RAM (ReRAM) or a ferroelectric RAM (FeRAM). The memory device 565 may be embedded within the application processor 500.

As shown in FIG. 4, the described elements 510, 520, and 540-590 communicate with one another via a system bus 501.

The display device 595 may display images defined by multimedia data provided by an operation of the accelerator 580, or a software accelerator loaded to the CPU core 510. The display device 595 may be a light emitting diode (LED) display device, an organic LED (OLED) display device, or one of other types of display devices. The display controller 590 may control operations of the display device 595.

The memory controller 560 may include a performance monitoring unit internally. The performance monitoring unit may measure an access amount to the memory device 595. The DVFS controller 515 may select one of the DVFS policies based on the measured access amount. In addition, each of the accelerator 580 and the display controller 590 may include a performance monitoring unit internally, and the DVFS controller 515 may determine the DVFS policy based on measured results of the performance monitoring units.

Referring to FIGS. 4 and 5, the DVFS controller 515 may be implemented in software (S/W) or firmware. The DVFS controller 515 may be implemented as a program and installed in the memories 540, 570 and 565. The implementing program may be executed by the CPU core 510 when the application processor 500 is powered on.

The DVFS controller 515 may control the memories 540, 570 and/or 565, the timer 565, the PMU 520, the CMU 530 and the power management device 100. The memories 540, 570 and 565, the timer 565, the PMU 520, the CMU 530 and the power management device 100 may each be implemented in hardware (H/W). An operating system and/or associated middleware may be intervened between the DVFS controller 515, and the memories 540, 570 and 565, the timer 565, the PMU 520, the CMU 530 and the power management device 100.

Figure 6:
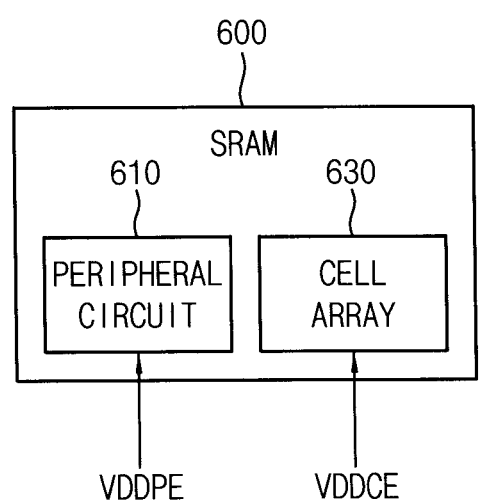
FIG. 6 illustrates one intellectual property (IP) in the application processor of FIG. 4, according to an exemplary embodiment.

FIG. 6 illustrates one IP in the application processor of FIG. 4, according to an exemplary embodiment.

In FIG. 6, it is assumed that an IP 600 in the application processor 500 is an SRAM that may be included in the CPU core 510. The SRAM 600 may be included in the CPU core 510. In addition, the SRAM 600 may be used as cache memories, registers or buffers in the SoC 10. The SRAM 600 may be relatively frequently used in a system that requires a high operating speed. Recently, a level of an operating voltage in an SoC employed in mobile devices tends to be lowered for reducing power consumption. Therefore, the level of the driving voltage applied to the SRAM 600 in the SoC 10 also tends to be lowered. As manufacturing process of the SRAM 600 has become minutely detailed, a sensing margin of the SRAM 600 is decreased.

For coping with the reduced sensing margin, the level of the first driving voltage VDDCE applied to the memory cells of the SRAM 600 is maintained for an enough sensing margin, and the level of the second driving voltage VDDPE applied to control logics is lowered. The individual supply of powers to respective power domains of the SRAM may be referred to as a dual power rail scheme.

Referring to FIG. 6, the SRAM 600 includes a cell array 630 that stores data and a peripheral circuit 610 that accesses the cell array 630. The cell array 630 operates based on the first driving voltage VDDCE by receiving the first driving voltage VDDCE from the power management device 100, and the peripheral circuit 610 operates based on the second driving voltage VDDPE by receiving the second driving voltage VDDPE from the power management device 100. The PMU 520 monitors the second driving voltage VDDPE applied to the peripheral circuit 610. The DVFS controller 515 determines an operating voltage of the SRAM 600 according to the DVFS policy, and provides the power management device 100 with the command CMD directing the determined DVFS policy. The power management device 100 adjusts the levels of the first and second driving voltages VDDCE and VDDPE according to the determined driving mode, in response to the command CMD.

Although the SRAM 600 is included in the CPU core 510 in FIG. 6, another SRAM may be included in other IPs in the application processor 500, and the DVFS controller 515 may control the DVFS of another SRAM in other IPs in the application processor 500.

Figure 7:
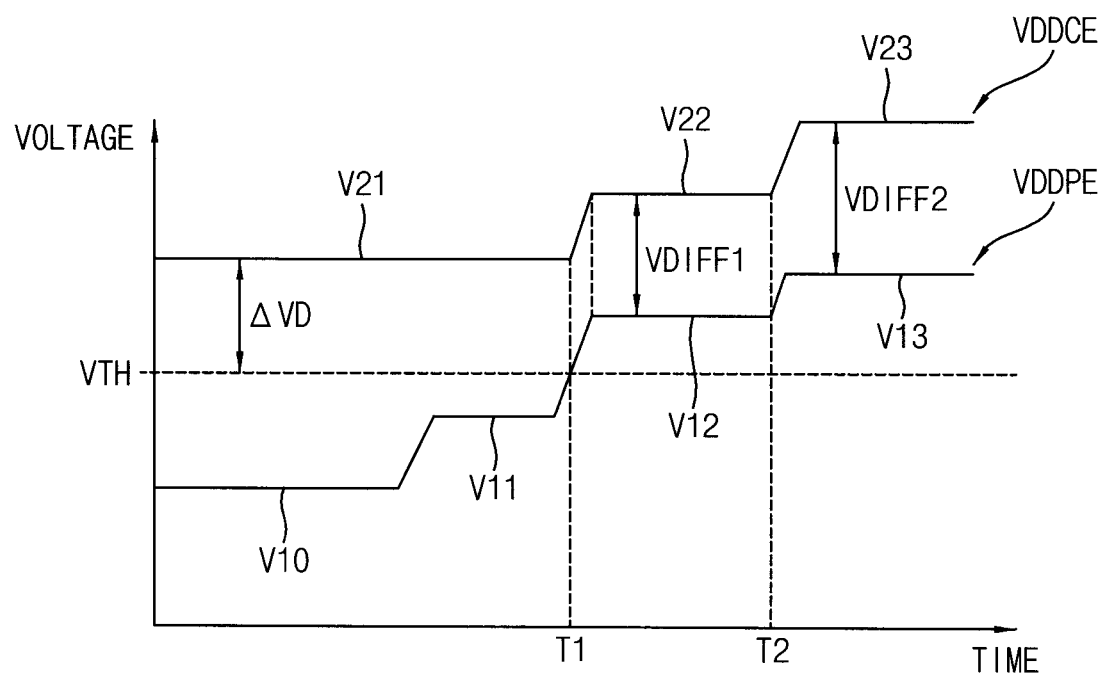
FIG. 7 is a graph illustrating changes of first and second driving voltages according to an operation of a static random access memory (SRAM) of FIG. 6, according to an exemplary embodiment.

FIG. 7 is a graph illustrating changes of the first and second driving voltages according to an operation of the SRAM of FIG. 6, according to an exemplary embodiment.

Referring to FIGS. 2, 6 and 7, before a time point T1, although the level of the second driving voltage VDDPE provided to the peripheral circuit 610 changes from a level V10 to a level V11, the first driving voltage VDDCE is maintained at level V21 that is higher than the reference level VTH by a voltage difference ΔVD because the level of the second driving voltage VDDPE is lower than the reference level VTH. At the time point T1, the DVFS controller 515 determines the DVFS policy such that the level of the second driving voltage VDDPE provided to the peripheral circuit 610 is to be equal to or higher than the reference level VTH, and the DVFS controller 515 transmits to the power management device 100 the command CMD directing the determined DVFS policy. The control logic 430 in the power management device 100 generates the first and second control voltages VCON1 and VCON2 according to the DVFS policy such that the level of the first driving voltage VDDCE is higher than the level of the second driving voltage VDDPE by the voltage difference VDIFF1 between time points T1 and T2. Each of the first and second reference voltage generators 131 and 137 generates each of the first and second reference voltages VREF1 and VREF2 in response to each of the first and second control voltages VCON1 and VCON2, and each of the first and second regulators 200 and 300 generates each of the first and second driving voltages VDDCE and VDDPE in response to each of the first and second reference voltages VREF1 and VREF2 while the voltage difference VDIFF1 between the first and second driving voltages VDDCE and VDDPE is maintained with the first driving voltage VDDCE having a level V22 and the second driving voltage VDDPE having a level V12.

At the time point T2, the DVFS controller 515 changes the DVFS policy and transmits to the power management device 100 the command CMD directing the changed DVFS policy. The control logic 430 in the power management device 100 generates the first and second control voltages VCON1 and VCON2 according to the DVFS policy such that the level of the first driving voltage VDDCE is higher than the level of the second driving voltage VDDPE by the voltage difference VDIFF2 after the time point T2. Each of the first and second reference voltage generators 131 and 137 generates each of the first and second reference voltages VREF1 and VREF2 in response to each of the first and second control voltages VCON1 and VCON2, and each of the first and second regulators 200 and 300 generates each of the first and second driving voltages VDDCE and VDDPE in response to each of the first and second reference voltages VREF1 and VREF2 while the voltage difference VDIFF2 between the first and second driving voltages VDDCE and VDDPE is maintained with the first driving voltage VDDCE having a level V23 and the second driving voltage VDDPE having a level V13.

Figure 8:
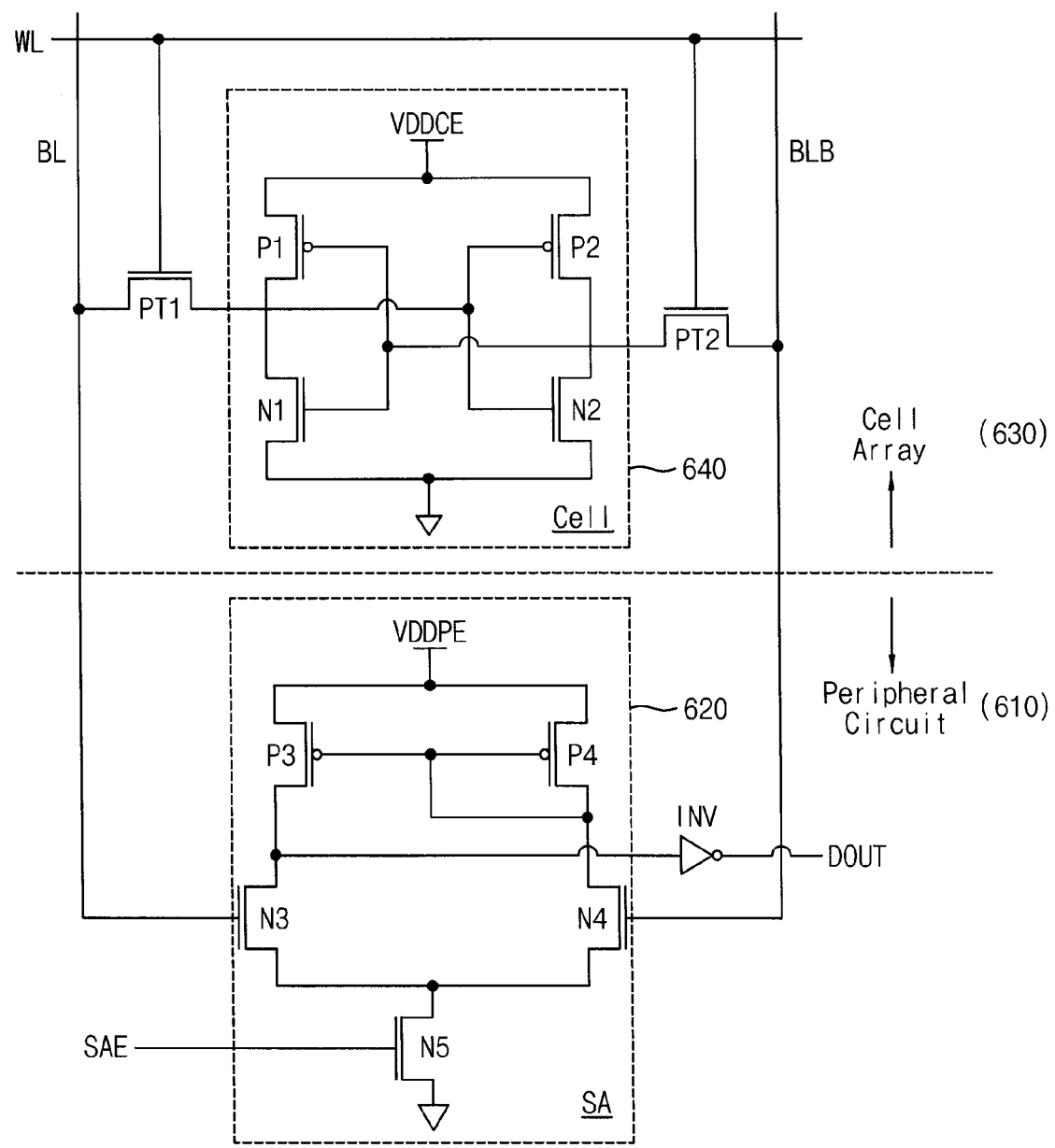
FIG. 8 is a circuit diagram illustrating a cell array and a peripheral circuit in the SRAM in FIG. 6, according to an exemplary embodiment.

FIG. 8 is a circuit diagram illustrating the cell array and the peripheral circuit in the SRAM in FIG. 6, according to an exemplary embodiment.

Referring to FIG. 8, the SRAM 600 of FIG. 6 includes a sense amplifier 620 and a memory cell 640. The sense amplifier 620 may be an example of the peripheral circuit 610, and the memory cell 640 may be a portion of the memory cell 630.

For example, the memory cell 640 may be a one-port SRAM cell of four transistors. The memory cell 640 may include a first inverter including a PMOS transistor P1 and an n-channel metal-oxide semiconductor (NMOS) transistor N1, and a second inverter including a PMOS transistor P2 and an NMOS transistor N2. The output of the first inverter is coupled to the input of the second inverter, and the output of the second inverter is coupled to the input of the first inverter. The memory cell 640 may be coupled to a bitline pair BL and BLB including a bitline BL and a complementary bitline BLB through pass transistors PT1 and PT2, the gates of which are coupled to a wordline WL. When a selection voltage is applied to the wordline WL, the pass transistors PT1 and PT2 are turned on, and the memory cell MC is electrically coupled to the bitline pair BL and BLB.

The memory cell 640 uses the first driving voltage VDDCE from the power management device 100 as a cell power supply voltage. That is, the first driving voltage VDDCE is provided to a common source of the PMOS transistors P1 and P2. Therefore, the memory cell 640 receives the first driving voltage VDDCE having a constant voltage difference with the reference level VTH, regardless of the level of the second driving voltage VDDPE applied to the peripheral circuit (for example, the sense amplifier) 620, in the first driving mode. The memory cell 640 receives the first driving voltage VDDCE whose level changes in cooperation with the second driving voltage VDDPE in the second driving mode. Therefore, the memory cell 640 may operate stably by securing an enough sensing margin regardless of the driving mode.

The sense amplifier 620 may detect the voltages on the bitline pair BL and BLB to sense the data stored in the memory cell 640. The sense amplifier 620 may include PMOS transistors P3 and P4 and NMOS transistors N3, N4 and N5. An inverter INV may be coupled to a common drain of the PMOS transistor P3 and the NMOS transistor N3, and the inverter INV inverts a voltage level of the common drain of the PMOS transistor P3 and the NMOS transistor N3 to provide an output data DOUT. A common gate of the PMOS transistors P3 and P4 is coupled to a common drain of the PMOS transistor P4 and the NMOS transistor N4. A common source of the NMOS transistors N3 and N4 may be selectively coupled to a ground voltage through the NMOS transistor N5. When a sense amp enable signal SAE is activated, the common source of the NMOS transistors N3 and N4 is coupled to the ground voltage, and the sensing operation of the sense amplifier 620 is enabled.

The sense amplifier 620 uses the second driving voltage VDDPE as a power supply voltage. That is, the second driving voltage VDDPE is applied to the common source of the PMOS transistors P3 and P4. Therefore, reduction of the sensing margin due to relative increase of the second driving voltage VDDPE may be prevented through a configuration of the SRAM 600, and power consumption may be reduced by lowering the level of the second driving voltage VDDPE applied to the sense amplifier 620 regardless of the level of the first driving voltage VDDCE in the first driving mode.

Figure 9:
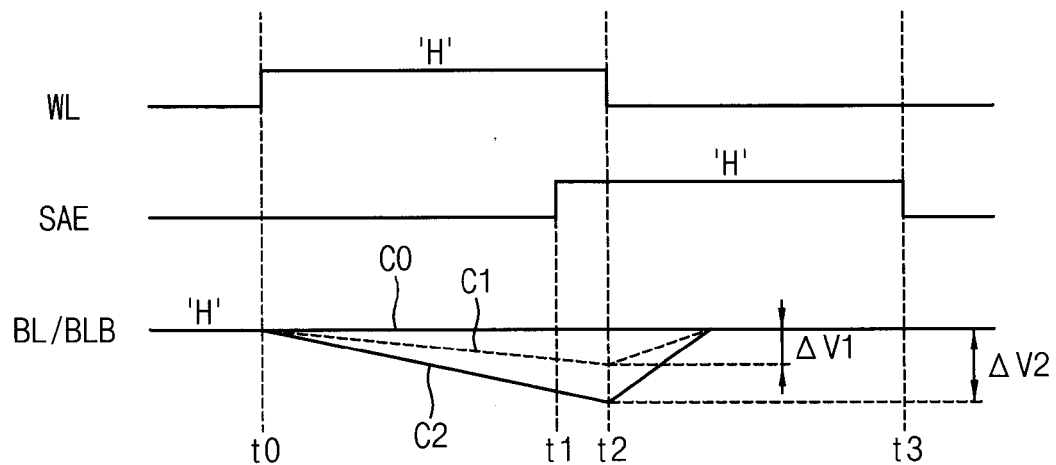
FIG. 9 is a timing diagram illustrating a sensing operation of the SRAM of FIG. 8, according to an exemplary embodiment.

FIG. 9 is a timing diagram illustrating a sensing operation of the SRAM of FIG. 8, according to an exemplary embodiment.

Referring to FIGS. 8 and 9, at a time point t0, the selected wordline WL is activated in a logic high level for read operation. The pass transistors PT1 and PT2 are turned on to couple the selected memory cell 640 to the bitline pair BL and BLB. The data stored in the memory cell 640 is transferred and developed to the bitline pair BL and BLB through the turned-on pass transistors PT1 and PT2. It is assumed that the bitline pair BL and BL is already precharged and equalized. For example, if the memory cell 640 stores the logic high level, the voltage of the bitline BL may be maintained at the precharged voltage as a reference numeral C0 in FIG. 9 shows.

However, the voltage of the complementary bitline BLB may be decreased by development or charge sharing between the memory cell 640 and the complementary bitline BLB as a reference numeral C1 in FIG. 9 shows.

At a time point t1, the sense amp enable signal SAE is activated in the logic high level to turn on the selection transistor N5 and the sense amplifier 342 is enabled to perform the sensing operation. The sensing operation of the sense amplifier 620 may be based on the voltage difference between the bitline pair BL and BLB. When the voltage difference between the bitline pair BL and BLB is not sufficient, the sensing operation may not be properly performed due to the decreased sensing margin. On the contrary, when the voltage difference between the bitline pair BL and BLB is sufficient, the sensing operation may be rapidly performed due to the increased sensing margin, and an operating speed of the SRAM may be increased.

At a time point t2, the wordline WL is deactivated in a logic low level. The pass transistors PT1 and PT2 are turned off, and the bitline pair BL and BLB is precharged. At a time point t3, the sense amp enable signal SAE is deactivated in the logic low level to disable the sense amplifier 620.

In FIG. 9, considering the voltage changes of the bitline pair BL and BLB with the selected wordline WL being activated, the sensing margin may increase as the voltage of the complementary bitline BLB corresponding to the logic low level rapidly changes. When the voltage change of the complementary bitline BLB corresponds to a dotted line represented by the reference numeral C1, the maximum voltage difference between the bitline pair BL and BLB at the time point t2 may correspond to $\Delta V1$. The dotted line represented by the reference numeral C1 corresponds to a case when the first driving voltage VDDCE is lower than the second driving voltage VDDPE. If the level of the first driving voltage VDDCE is lower than the level of the second driving voltage VDDPE, incorrect data may be output from the memory cell 640 because the sensing margin is not sufficient. However, referring to a solid line represented by the reference numeral C2 in which the level of the first driving voltage VDDCE is higher than the level of the second driving voltage VDDPE by a sufficient voltage difference, the maximum voltage difference between the bitline pair BL and BLB at the time point t2 may correspond to $\Delta V2$.

Figure 10:
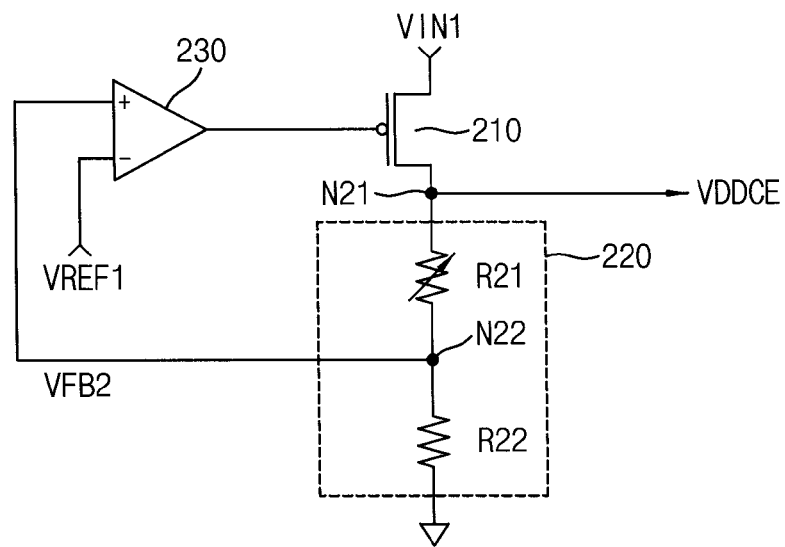
FIG. 10 is a circuit diagram illustrating a first regulator in FIG. 1, according to an exemplary embodiment.

FIG. 10 is a circuit diagram illustrating the first regulator in FIG. 1, according to an exemplary embodiment.

Referring to FIG. 10, the first regulator 200 may be implemented with a low drop-out (LDO) regulator. The first regulator 200 may include a PMOS transistor 210, a feedback unit 220 and an operational amplifier 230. The PMOS transistor 210 has a source to which the first input voltage VIN1 is applied, a drain connected to the feedback unit 220 at a node N21 and a gate connected to an output of the operational amplifier 230. The first driving voltage VDDCE is provided at the node N21. The feedback unit 220 includes resistors R21 and R22 connected to each other at a node N22. A feedback voltage VFB2 is acquired by dividing the first driving voltage VDDCE by a ratio of the resistors R21 and R22, and the feedback voltage VFB2 is provided to a positive input terminal of the operational amplifier 230. The first reference voltage VREF1 is provided to a negative input terminal of the operational amplifier 230. Therefore, the operational amplifier 230 amplifies a voltage difference between the feedback voltage VFB2 and the first reference voltage VREF1, and provides the amplified voltage difference to the gate of the PMOS transistor 210. Therefore, the first regulator 200 may generate, at the node N21, the first driving voltage VDDCE following the level of the first reference voltage VREF1. Accordingly, the first reference voltage generator 131 adjusts the level of the first reference voltage VREF1 based on the first control voltage VCON1, and the first regulator 200 adjusts the level of the first driving voltage VDDCE based on the first reference voltage VREF1.

Figure 11:
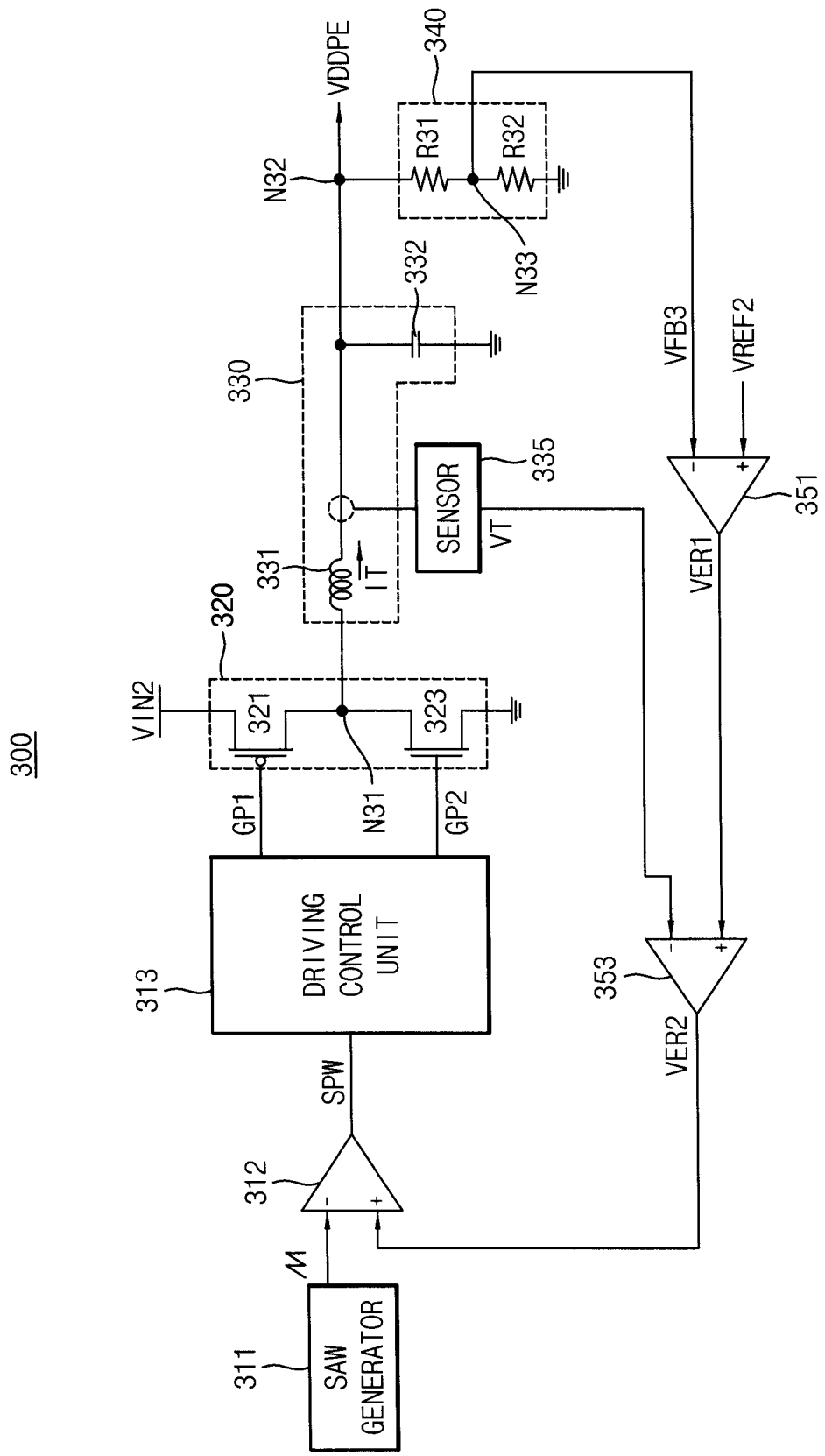
FIG. 11 is a circuit diagram illustrating a second regulator in FIG. 1, according to an exemplary embodiments.

FIG. 11 is a circuit diagram illustrating the second regulator in FIG. 1, according to an exemplary embodiment.

Referring to FIG. 11, the second regulator 300 may be implemented with a buck converter. The second regulator 300 may include a saw-tooth wave generator 311, a pulse-width modulation (PWM) comparator 312, a driving control unit 313, a driving device unit 320, a low-pass filter 330, a feedback unit 340, a sensor 335, a first error amplifier 351 and a second error amplifier 353. The driving device unit 320 includes a PMOS transistor 321 connected between the second input voltage VIN2 and a node N31, and an NMOS transistor 323 connected between the node N31 and a ground voltage.

The PMOS transistor 321 includes a source receiving the second input voltage VIN2, a gate receiving a first driving control signal GP1, and a drain connected to the node N31. The NMOS transistor 322 includes a drain connected to the node N31, a gate receiving a second driving control signal GP2 and a source connected to the ground voltage.

The low-pass filter 330 is connected between nodes N31 and N32, and includes an inductor 331 connected between the nodes N31 and N32 and a capacitor 332 connected between the node N32 and the ground voltage. The sensor 335 senses a current IT flowing through the inductor 331, and converts the current IT to a corresponding voltage VT to be provided to the second error amplifier 353.

The feedback unit 340 includes resistors R31 and R32 which are connected in series between a node N32 and the ground voltage. The feedback unit 340 provides a feedback voltage VFB3. The feedback voltage VFB3 is generated by dividing the second driving voltage VDDPE at a node N33 where the resistors R31 and R32 are connected to each other.

The first error amplifier 351 amplifies a voltage difference between the feedback voltage VFB3 and the second reference voltage VREF2 to output a first error voltage VER1. The second error amplifier 553 amplifies a voltage difference between the first error voltage VER1 and the voltage VT to output a second error voltage VER2.

The PWM comparator 312 compares the second error voltage VER2 and a saw-tooth wave from the saw-tooth wave generator 311 to output a pulse signal SPW having a pulse width corresponding to a voltage difference between the second error voltage VER2 and the saw-tooth wave. The driving control unit 313 generates the first driving control signal GP1 to be provided to the gate of the PMOS transistor 321, which turns on/turns off the PMOS transistor 321, and generates the second driving control signal GP2 to be provided to the gate of the NMOS transistor 323, which turns on/turns off the NMOS transistor 323, in response to the pulse signal SPW. The PMOS transistor 321 and the NMOS transistor 323 may be complementarily turned on/turned off in response to the first driving control signal GP1 and the second driving control signal GP2, respectively.

The low-pass filter 330 low-pass filters a voltage at the node N31 to provide the second driving voltage VDDPE. That is, the low-pass filter 330 may filter harmonics having a high frequency in the second input voltage VIN2 to provide the second driving voltage VDDPE. Therefore, the second regulator 300 may generate, at the node N32, the second driving voltage VDDPE following the level of the second reference voltage VREF2. Accordingly, the second reference voltage generator 137 adjusts the level of the second reference voltage VREF2 based on the second control voltage VCON2, and the second regulator 300 adjusts the level of the second driving voltage VDDPE based on the second reference voltage VREF2.

Figure 12:
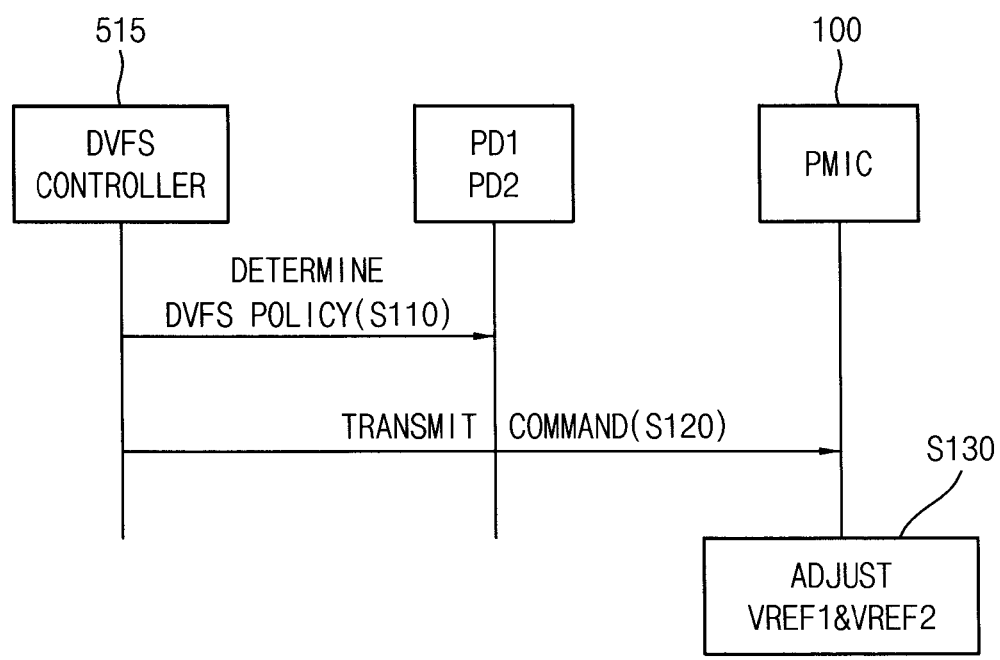
FIG. 12 illustrates a method of controlling the SoC according to an exemplary embodiment.

FIG. 12 illustrates a method of controlling the SoC according to an exemplary embodiment.

Referring to FIGS. 1, 2, 4 and 12, when the application processor 500 is powered on, the DVFS controller 515 determines (or selects) a DVFS policy according to operations of the first power domain PD1 and the second power domain PD2 (S110), and transmits to the power management device 100 the command CMD directing the determined DVFS policy (S120). The power management device 100 adjusts the levels of the first and second reference voltages VREF1 and VREF2 according to the determined DVFS policy, and adjusts the levels of the first and second driving voltages VDDCE (S130) and the VDDPE based on the first and second reference voltages VREF1 and VREF2.

For example, when the application processor 500 needs to lower the level of the second driving voltage VDDPE below the reference level VTH according to the DVFS policy, the DVFS controller 515 transmits the command CMD directing the first driving mode to the control logic 430. The control logic 430 refers to the reference level VTH stored in the first register 410 and adjusts the level of the first control voltage VCON1 to be provided to the first reference voltage generator 131, in response to the CMD directing the first driving mode. The first reference voltage generator 131 adjusts the level of the first reference voltage VREF1 to be provided to the first regulator 200 in response to the first control voltage VCON1 such that the first regulator 200 generates the first driving voltage VDDCE having a constant voltage difference with the reference level VTH.

For example, when the application processor 500 needs to set the level of the second driving voltage VDDPE above the reference level VTH according to the DVFS policy, the DVFS controller 515 transmits the command CMD directing the second driving mode to the control logic 430. The control logic 430 refers to the set voltage differences VDIFF1 and VDIFF2 stored in the second register 420, adjusts the level of the first control voltage VCON1 to be provided to the first reference voltage generator 131 and adjusts the level of the second control voltage VCON2 to be provided to the second reference voltage generator 137, in response to the CMD directing the second driving mode. The first reference voltage generator 131 adjusts the level of the first reference voltage VREF1 to be provided to the first regulator 200 in response to the first control voltage VCON1 such that the first regulator 200 generates the first driving voltage VDDCE conforming to the DVFS policy. The second reference voltage generator 137 adjusts the level of the second reference voltage VREF2 to be provided to the second regulator 300 in response to the second control voltage VCON2 such that the second regulator 300 generates the second driving voltage VDDPE conforming to the DVFS policy. The first driving voltage VDDCE may be changed in cooperation with a change of the second driving voltage VDDPE according to the DVFS policy.

Figure 13:
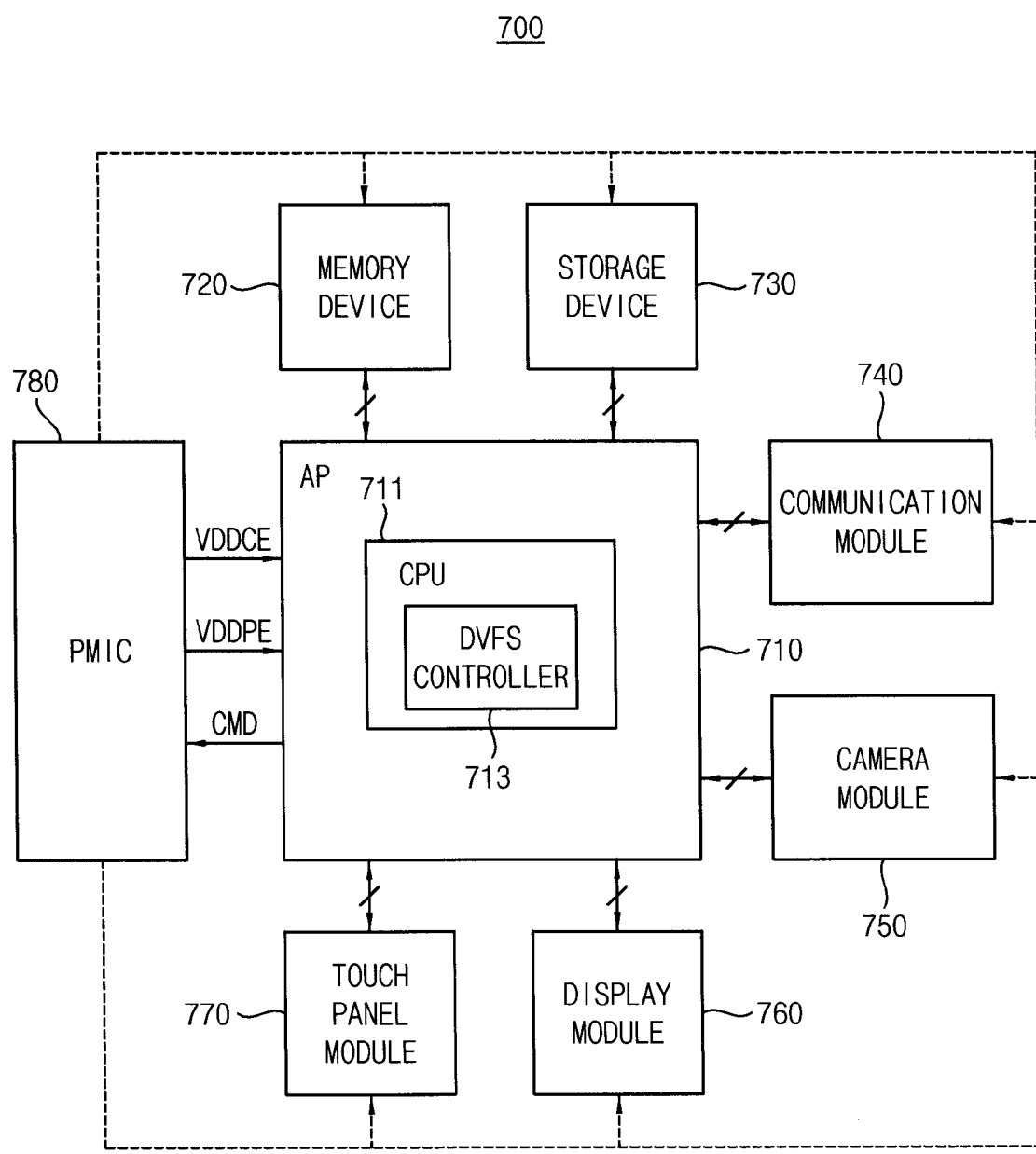
FIG. 13 is a block diagram illustrating a mobile device according to an exemplary embodiment.
Figure 14:
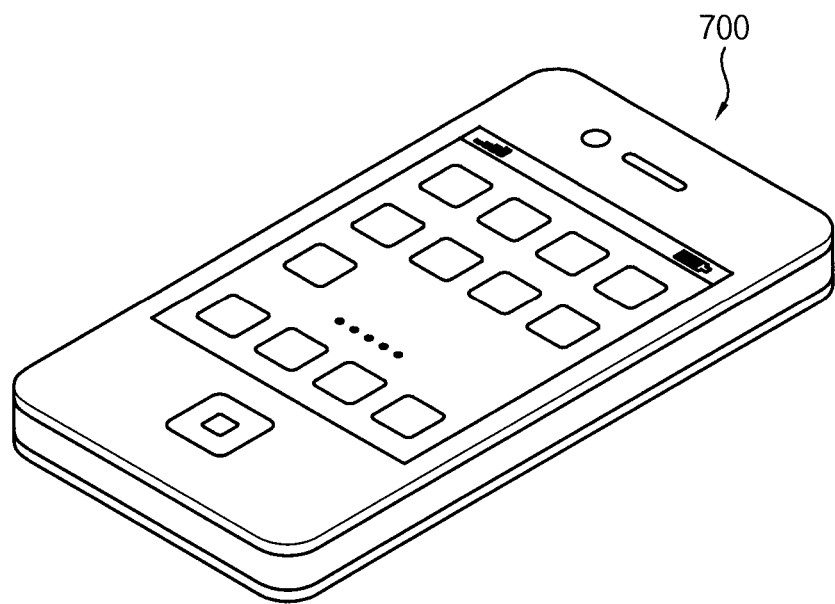
FIG. 14 is a diagram illustrating an example in which the mobile device of FIG. 13 is implemented as a smart-phone.

FIG. 13 is a block diagram illustrating a mobile device according to an exemplary embodiment, and FIG. 14 is a diagram illustrating an example in which a mobile device of FIG. 13 is implemented as a smart-phone.

Referring to FIGS. 13 and 14, a mobile device 700 includes an application processor 710, a memory device 720, a storage device 730, multiple functional modules 740, 770, 760, and 770, and a power management device 780 that provides an operating voltage to the application processor 710, the memory device 720, the storage device 730, and the functional modules 740, 750, 760, and 770, respectively. For example, as illustrated in FIG. 14, the mobile device 700 may be implemented as a smart-phone.

The application processor 710 controls overall operations of the mobile device 700. For instance, the application processor 710 controls the memory device 720, the storage device 730, and the functional modules 740, 750, 760, and 770. The application processor 710 may include a CPU core 711. A DVFS controller 713 implemented in the CPU core 711 may transmit to the power management device 780 a command CMD directing a driving mode of the power management device 780 according to a DVFS policy determined by the application processor 710. The application processor 710 may be implemented by the application processor to the application processor 500 of FIG. 4.

The application processor 710, as described above, may provide the power management device 780 with the command CMD that directs a driving mode of the first and second driving voltages VDDCE and VDDPE, and are provided from the power management device 780 according to the DVFS policy determined based on the operation of IPs in the mobile device 700. The first and second driving voltages VDDCE and VDDPE have a correlation. The power management device 780 maintains the level of the first driving voltage VDDCE in the first driving mode and changes the first driving voltage VDDCE in cooperation with a change of the second driving voltage VDDPE in the second driving mode, in response to the command CMD.

The memory device 720 and the storage device 730 store data for operations of the mobile device 700. The memory device 720 may correspond to a volatile semiconductor memory device such as a dynamic random access memory (DRAM) device, a static random access memory (SRAM) device, a mobile DRAM, etc. In addition, the storage device 730 may correspond to a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some embodiments, the storage device 730 may correspond to a solid state drive (SSD) device, a hard disk drive (HDD) device, a CD-ROM device, etc.

The functional modules 740, 750, 760, and 770 perform various functions of the mobile device 700. For example, the mobile device 700 may comprise a communication module 740 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for a microwave access (WIMAX) module, etc.), a camera module 750 that performs a camera function, a display module 760 that performs a display function, a touch panel module 770 that performs a touch sensing function, etc. In some embodiments, the mobile device 700 further includes a global positioning system (GPS) module, a microphone (MIC) module, a speaker module, a gyroscope module, etc. However, a kind of the functional modules 740, 750, 760, and 770 in the mobile device 700 is not limited thereto.

Figure 15:
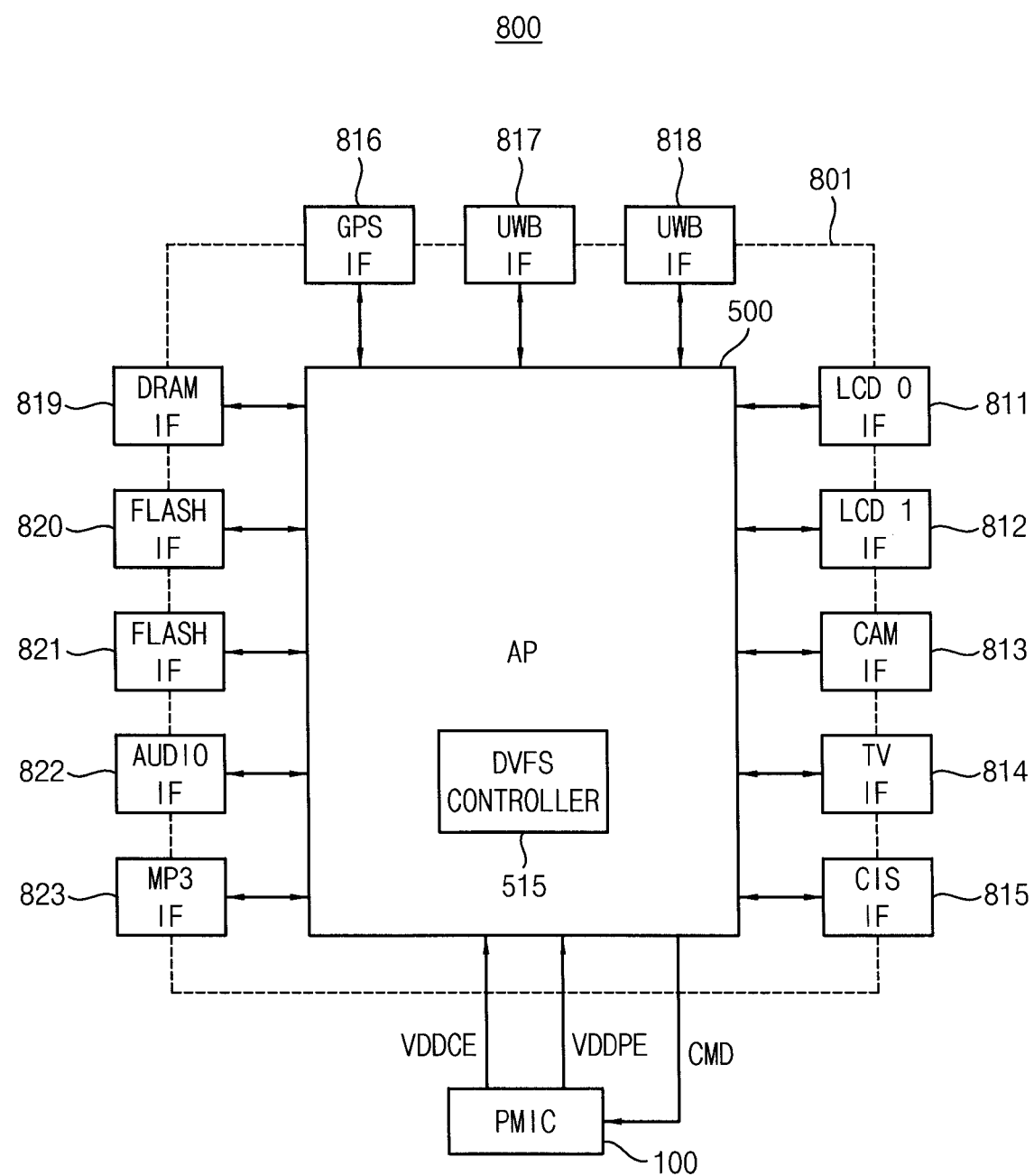
FIG. 15 is a block diagram illustrating an electronic device including the application processor and a power management device of FIG. 2, according to an exemplary embodiment.

FIG. 15 is a block diagram illustrating an electronic device including the application processor and the power management device of FIG. 1, according to an exemplary embodiment.

Referring to FIGS. 1 and 15, an electronic device 800 may be embodied in a personal computer (PC), a laptop computer, a mobile phone, a smart phone, a tablet PC, a personal digital assistant (PDA), and/or a portable multimedia player (PMP).

The electronic device 800 includes the power management device 100 and an SoC 801 including the application processor 500 and a plurality of interfaces 811 to 823. The CPU core 510 of the application processor 500 controls a general operation of the electronic device 800.

The application processor 500 may communicate with each of a plurality of peripheral devices through each of a plurality of interfaces 811 to 823. For example, each of the plurality of interfaces 811 to 823 may transmit at least one control signal, which is output from a corresponding IP among a plurality of IPs embodied in each of power domains to each of the plurality of peripheral devices.

For example, the application processor 500 may control a power state and an operation state of each flat panel display device through each display interface 811 and 812. The flat display device includes a liquid crystal display (LCD), a light emitting diode (LED) display, an organic light emitting diode (OLED) display or an active matrix organic light-emitting diode (AMOLED) display.

The application processor 500 may control a power state and an operation state of a camcorder through a camcorder interface 813, control a power state and an operation state of a TV module through a TV interface 814, and control a power state and an operation state of a camera module or an image sensor module through an image sensor interface 815.

The application processor 500 may control a power state and an operation state of a GPS module through a GPS interface 816, control a power state and an operation state of an ultra wideband (UWB) module through a UWB interface 817, and control a power state and an operation state of a USB drive through a USB drive interface 818.

The application processor 500 may control a power state and an operation state of a dynamic random access memory (DRAM) through a DRAM interface 819, control a power state and an operation state of a non-volatile memory device, e.g., a flash memory, through a non-volatile memory interface 820, e.g., a flash memory interface, control a power state and an operation state of an audio module through an audio interface 821, control a power state of a multi-format codec (MFC) through an MFC interface 822, and control a power state of an MP3 player through an MP3 player interface 823. Here, a module or an interface may be embodied in hardware or software.

The application processor 500, as mentioned above, may provide the power management device 100 with the command CMD that directs the driving mode of the first and second driving voltages VDDCE and VDDPE, and are provided from the power management device 100 according to the DVFS policy determined by the DVFS controller 515. The first and second driving voltages VDDCE and VDDPE have a correlation. The power management device 100 maintains the level of the first driving voltage VDDCE in the first driving mode and changes the first driving voltage VDDCE in cooperation with a change of the second driving voltage VDDPE in the second driving mode, in response to the command CMD.

Figure 16:
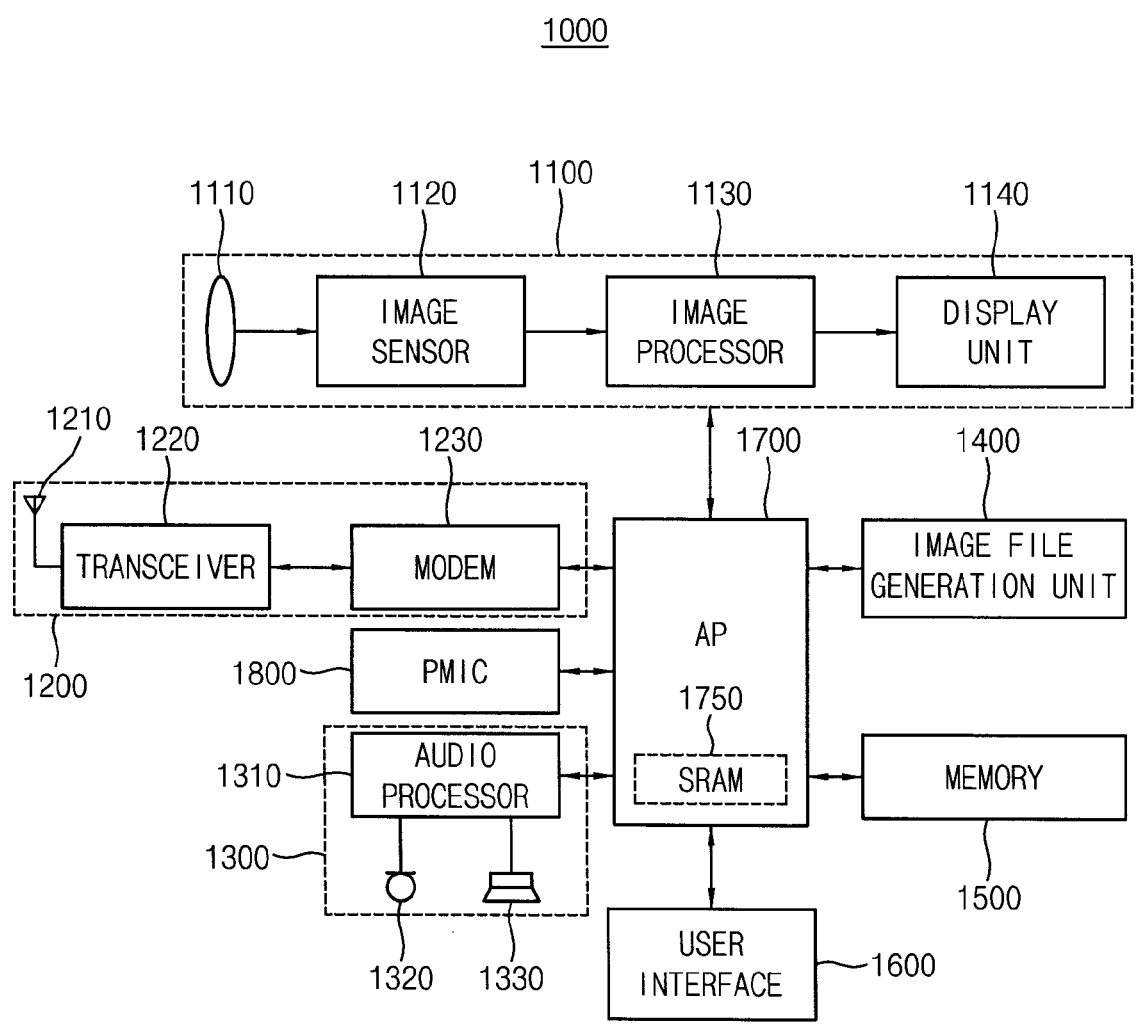
FIG. 16 is a block diagram illustrating a portable terminal according to an exemplary embodiment.

FIG. 16 is a block diagram illustrating a portable terminal according to an exemplary embodiment.

Referring to FIG. 16, a portable terminal 1000 includes an image processing block 1100, a wireless transceiving block 1200, an audio processing block 1300, an image file generation unit 1400, a memory device 1500, a user interface 1600, an application processor 1700 and a power management device 1800.

The image processing block 1100 includes a lens 1110, an image sensor 1120, an image processor 1130 and a display unit 1140. The wireless transceiving block 1200 includes an antenna 1210, a transceiver 1220 and a modem 1230. The audio processing block 1300 includes an audio processor 1310, a microphone 1320 and a speaker 1330.

The portable terminal 100 includes various kinds of semiconductor devices. The application processor 1700 requires low power consumption and a high performance. The application processor 1700 has multi-cores as a manufacturing process has become minutely detailed. The application processor 1700 may include an SRAM 1750 according to example embodiments, and the SRAM 1750 may include a first power domain and a second power domain which receive a first driving voltage and a second driving voltage, respectively. The first driving voltage and the second driving voltage have a correlation. The power management device 1800 may provide the SRAM with the first driving voltage and the second driving voltage that have levels according to the driving mode based on the command from the application processor 1700.

The above described embodiments may be applied to various kinds of SoCs such as a mobile phone, a smart phone, a tablet computer, a laptop computer, a personal digital assistant PDA, a portable multimedia player PMP, a digital camera, a portable game console, a music player, a camcorder, a video player, a navigation system, etc.

While the present disclosure has been described with reference to example embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A power management device comprising:
a first regulator configured to provide a first driving voltage to a first power domain of an application processor;
a second regulator configured to provide a second driving voltage to a second power domain of the application processor, a level of the second driving voltage being lower than a level of the first driving voltage, the second driving voltage having a correlation with the first driving voltage;
a reference voltage generation circuit configured to provide a first reference voltage to the first regulator and provide a second reference voltage to the second regulator; and
a control register unit configured to control the reference voltage generation circuit such that the level of the first driving voltage is maintained in a first driving mode, and the first driving voltage and the second driving voltage have a set voltage difference in a second driving mode, in response to a command from the application processor,
wherein the level of the second driving voltage is lower than a reference level in the first driving mode, and
wherein the level of the second driving voltage is equal to or higher than the reference level in the second driving mode.

2. The power management device of claim 1, wherein the control register unit comprises:
a first register configured to store the reference level;
a second register configured to store at least one set voltage difference between the first driving voltage and the second driving voltage; and
a control logic configured to generate a first control voltage for controlling the first regulator and a second control voltage for controlling the second regulator by referring to the first register and the second register according to a driving mode in response to the command.

3. The power management device of claim 2, wherein the reference voltage generation circuit is configured to generate the first reference voltage and provide the first reference voltage to the first regulator in response to the first control voltage, and configured to generate the second reference voltage and provide the second reference voltage to the second regulator in response to the second control voltage.

4. The power management device of claim 2, wherein the reference voltage generation circuit comprises:
a first reference voltage generator configured to maintain a level of the first reference voltage in response to the first control voltage in the first driving mode and configured to increase the level of the first reference voltage in response to the first control voltage in the second driving mode; and
a second reference voltage generator configured to increase a level of the second reference voltage in response to the second control voltage in the second driving mode.

5. The power management device of claim 2, wherein the control logic is configured to maintain a level of the first control voltage in the first driving mode in response to the command.

6. The power management device of claim 2, wherein the control logic is configured to increase a level of the first control voltage in the second driving mode in response to the command.

7. The power management device of claim 1, wherein the first regulator is a low drop-out regulator, and the second regulator is a buck converter.

8. A system-on-chip (SoC) comprising:
an application processor comprising:
a first power domain configured to receive a first driving voltage and operate based on the first driving voltage;
a second power domain configured to receive a second driving voltage and operate based on the second driving voltage, the second power domain having a correlation with the first power domain;
a power management unit configured to control supply and/or cutoff of the first driving voltage to the first power domain and configured to control supply and/or cutoff of the second driving voltage to the second power domain; and
a dynamic voltage frequency scaling (DVFS) controller configured to generate a command that directs a driving mode of the first driving voltage and the second driving voltage; and
a power management device including:
a first regulator configured to generate the first driving voltage;
a second regulator configured to generate the second driving voltage;
a reference voltage generation circuit configured to provide a first reference voltage to the first regulator and provide a second reference voltage to the second regulator; and
a control register unit configured to control the reference voltage generation circuit such that a level of the first driving voltage is maintained in a first driving mode, and the first driving voltage and the second driving voltage have a set voltage difference in a second driving mode,
wherein the level of the second driving voltage is lower than a reference level in the first driving mode, and
wherein the level of the second driving voltage is equal to or higher than the reference level in the second driving mode.

9. The SoC of claim 8, wherein the DVFS controller is configured to generate the command that directs the driving mode based on operations of the first power domain and the second power domain.

10. The SoC of claim 8, wherein the power management device is configured to adjust the level of the first driving voltage and a level of the second driving voltage in response to the command.

11. The SoC of claim 8, wherein the application processor includes a central processing unit (CPU) core that implements the DVFS controller.

12. The SoC of claim 8, wherein the application processor is configured to transmit the command to the power management device through an inter-integrated circuit (I2C) interface.

13. The SoC of claim 8, wherein the first regulator is configured to maintain the level of the first driving voltage based on a first input voltage and the first reference voltage, in response to the command that directs the first driving mode.

14. The SoC of claim 8, wherein the first driving voltage has a constant voltage difference with respect to the reference level.

15. The SoC of claim 8, wherein the first power domain corresponds to at least one memory cell of a static random access memory (SRAM) in the application processor, and the second power domain corresponds to a peripheral circuit of the SRAM, the peripheral circuit being configured to access the at least one memory cell.

16. A mobile device comprising:

an application processor configured to generate a command that directs a driving mode;

a memory device;

a storage device; and a power management device:

wherein the power management device comprises:

a first regulator configured to provide a first driving voltage to a first power domain of the application processor;

a second regulator configured to provide a second driving voltage to a second power domain of the application processor, a level of the second driving voltage being lower than a level of the first driving voltage, the second driving voltage having a correlation with the first driving voltage;

a reference voltage generation circuit configured to provide a first reference voltage to the first regulator and provide a second reference voltage to the second regulator; and a control register unit configured to control the reference voltage generation circuit such that the level of the first driving voltage is maintained in a first driving mode, and the first driving voltage and the second driving voltage have a set voltage difference in a second driving mode, in response to the command from the application processor, wherein the level of the second driving voltage is lower than a reference level in the first driving mode, and wherein the level of the second driving voltage is equal to or higher than the reference level in the second driving mode.

17. The mobile device of claim 16, wherein the application processor includes a dynamic voltage frequency scaling (DVFS) controller configured to generate the command that directs the driving mode based on a comparison of the second driving voltage and the reference level.

18. The mobile device of claim 17, wherein the DVFS controller is configured to generates the command that directs the first driving mode when the level of the second driving voltage needs to be lower than the reference level.

19. The mobile device of claim 17, wherein the DVFS controller is configured to generate the command that directs the second driving mode when the level of the second driving voltage needs to be equal to or higher than the reference level.

20. The mobile device of claim 16, wherein the first regulator is configured to increase the level of the first driving voltage based on a first input voltage and the first reference voltage, and wherein the second regulator is configured to increase the level of the second driving voltage based on a second input voltage and the second reference voltage.

* * * * *